United States Patent
Neu et al.

(10) Patent No.: US 10,913,437 B2
(45) Date of Patent: Feb. 9, 2021

(54) METHOD FOR OPERATING A VEHICLE BRAKE SYSTEM

(71) Applicant: Continental Teves AG & Co. oHG, Frankfurt am Main (DE)

(72) Inventors: Andreas Neu, Kuhardt (DE); Michael Hitzel, Rödermark (DE); Michael Jung, Limburg (DE); Tobias Scheller, Hofbieber (DE)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 16/328,922

(22) PCT Filed: Aug. 1, 2017

(86) PCT No.: PCT/EP2017/069411
§ 371 (c)(1),
(2) Date: Feb. 27, 2019

(87) PCT Pub. No.: WO2018/041503
PCT Pub. Date: Mar. 8, 2018

(65) Prior Publication Data
US 2019/0248352 A1    Aug. 15, 2019

(30) Foreign Application Priority Data

Sep. 1, 2016    (DE) .................. 10 2016 216 542

(51) Int. Cl.
*B60T 13/68*    (2006.01)
*B60T 8/173*    (2006.01)
(Continued)

(52) U.S. Cl.
CPC ............. *B60T 13/686* (2013.01); *B60T 7/12* (2013.01); *B60T 8/17* (2013.01); *B60T 8/173* (2013.01);
(Continued)

(58) Field of Classification Search
CPC ... B60T 7/12; B60T 8/17; B60T 8/173; B60T 8/176; B60T 13/145; B60T 13/686;
(Continued)

(56) References Cited

U.S. PATENT DOCUMENTS 5,882,090 A * 3/1999 Ganzel ................... B60T 8/341
                                                                  303/113.2
5,927,824 A * 7/1999 Pahl ......................... B60T 8/38
                                                                  303/113.2
(Continued)

FOREIGN PATENT DOCUMENTS

CN    102762424 A    10/2012
CN    102781744 A    11/2012
(Continued)

OTHER PUBLICATIONS

German Search Report for German Application No. 10 2016 216 542.9, with partial translation, dated Jul. 10, 2017—8 pages.
(Continued)

*Primary Examiner* — Robert A. Siconolfi
*Assistant Examiner* — San M Aung
(74) *Attorney, Agent, or Firm* — RatnerPrestia

(57) ABSTRACT

A method for operating a dual-circuit hydraulic brake system of a vehicle having an ABS function to feed back pressure medium from low-pressure reservoirs. When there is an autonomous pressure buildup request to increase brake pressure and an ABS control system is simultaneously activated, the following steps are carried out: monitoring the filling degree of the low-pressure reservoirs; emptying the low-pressure reservoir whose filling first reaches a defined threshold value; and if, during the execution of the low-pressure reservoir emptying process at the one low-pressure reservoir, the filling of the other low-pressure reservoir reaches the threshold value and the degree of emptying of
(Continued)

the one low-pressure reservoir undershoots a defined threshold value, or the filling of the other low-pressure reservoir exceeds the threshold value by k/100, interrupting the low-pressure reservoir emptying process at the one low-pressure reservoir, and carrying out a low-pressure reservoir emptying process at the other low-pressure reservoir.

4 Claims, 2 Drawing Sheets

(51) Int. Cl.
  *B60T 7/12* (2006.01)
  *B60T 8/17* (2006.01)
  *B60T 8/176* (2006.01)
  *B60T 13/14* (2006.01)
(52) U.S. Cl.
  CPC ............ *B60T 8/176* (2013.01); *B60T 13/145* (2013.01); *B60T 2270/10* (2013.01)
(58) Field of Classification Search
  CPC .... B60T 2270/10; B60T 13/22; B60T 13/261; B60T 13/268; B60T 13/665; B60T 17/12; B60T 17/18
  USPC ............. 303/13, 10, 20, 113.2, 113.4, 115.4, 303/116.1, 119.1
  See application file for complete search history.

(56) References Cited

U.S. PATENT DOCUMENTS

| | | | |
|---|---|---|---|
| 6,145,940 A * | 11/2000 | Fuhrer | ................. B60T 8/4275 303/113.4 |
| 8,894,159 B2 | 11/2014 | Nakata et al. | |
| 8,950,826 B2 | 2/2015 | Kunz | |
| 9,333,957 B2 | 5/2016 | Ross et al. | |
| 9,403,518 B2 | 8/2016 | Strengert et al. | |
| 9,499,143 B2 | 11/2016 | Kunz et al. | |
| 9,963,134 B2 | 5/2018 | Ross et al. | |
| 10,202,109 B2 | 2/2019 | Baumann | |
| 2004/0118623 A1 | 6/2004 | Shore et al. | |
| 2015/0307072 A1 | 10/2015 | Strengert et al. | |
| 2016/0096434 A1* | 4/2016 | Nakaoka | ................. B60L 3/108 701/78 |

FOREIGN PATENT DOCUMENTS

| | | |
|---|---|---|
| CN | 103167978 A | 6/2013 |
| CN | 103338988 A | 10/2013 |
| CN | 105579306 A | 5/2016 |
| DE | 19816290 A1 | 4/1999 |
| DE | 102004011518 A1 | 10/2004 |
| DE | 102014212986 A1 | 1/2016 |
| JP | 5158253 B2 | 3/2013 |
| KR | 20120135240 A | 12/2012 |

OTHER PUBLICATIONS

International Search Report and Written Opinion for Application No. PCT/EP2017/069411, dated Nov. 7, 2017—8 pages.
Korean Grant of Patent for Korean Application No. 10-2019-7006011, dated Jul. 27, 2020, with translation, 2 pages.
Chinese Office Action for Chinese Application No. 201780053932.4, dated Sep. 30, 2020, with translation, 8 pages.

* cited by examiner

METHOD FOR OPERATING A VEHICLE BRAKE SYSTEM

CROSS REFERENCE TO RELATED APPLICATIONS

This application is the U.S. National Phase Application of PCT International Application No. PCT/EP2017/069411, filed Aug. 1, 2017, which claims priority to German Patent Application No. 10 2016 216 542.9, filed Sep. 1, 2016, the contents of such applications being incorporated by reference herein.

FIELD OF THE INVENTION

The invention relates to a method for operating a vehicle brake system.

BACKGROUND OF THE INVENTION

Modern vehicles are generally equipped with electronically regulated brake systems which make available functions such as an anti-lock brake control system (ABS), which prevents the wheels locking during a braking operation, braking assistant (HBA) which makes available a rapid pressure buildup when a hazardous situation is detected, until the anti-lock brake control system engages, fading brake support (FBS) which generates an additional brake pressure buildup by means of a feedback pump in the event of a loss of braking force, and a driving dynamics control system (ESC).

Emergency braking functions are implemented, for example, with a brake assistant and/or an FBS system which, when a hazardous situation is detected, make available a rapid pressure buildup until an anti-lock brake control system engages. In these functions, the hydraulic pressure in the wheel brakes is regulated within the scope of a regulating or autonomous braking intervention by individually switching inlet valves and/or outlet valves.

Such a vehicle hydraulic brake system which is known from DE 10 2004 011 518 A1, incorporated herein by reference, comprises, according to FIG. 1, a first brake circuit 1.1 and a second brake circuit 1.2 as well as a brake control unit 20, which generates control signals for the valves of the two brake circuits 1.1 and 1.2 as output signals A on the basis of sensor signals E as input signals.

The first brake circuit 1.1 for a front left-hand wheel 2.1 (FL) and a rear right-hand wheel 2.1 (RR) is connected via a block valve 7.1 to a master brake cylinder 5 embodied as a tandem brake cylinder (THZ). The second brake circuit 1.2 for a front right-hand wheel 2.2 (FR) and a rear left-hand wheel 2.2 (RL) is likewise connected to the master brake cylinder 5 via an block valve 7.2.

Wheel brakes 2.11 and 2.21 of the wheels 2.1 and 2.2, respectively, are connected by respective hydraulic lines to the first brake circuit 1.1 and the second brake circuit 1.2.

The brake system 1 has a brake booster 5.1, which is connected to the master brake cylinder 5, and a storage reservoir 5.2 for the brake fluid or hydraulic fluid as the pressure medium. On the outlet side, the master brake cylinder 5 generates a brake pressure P as a feed pressure in accordance with a brake pedal 6, which is connected to the brake booster 5.1 and is actuated by a driver. This feed pressure p is fed on the inlet side to the open inlet valves 8.10 and 8.11 of the first brake circuit 1.1 and the open inlet valves 8.20 and 8.21 of the second brake circuit 1.2 via the open block valves 7.1 and 7.2 to enable a corresponding hydraulic brake pressure to build up at the wheel brakes 2.11 and 2.21 of the wheels 2.1 and 2.2. The inlet valves 8.10 and 8.11 as well as 8.20 and 8.21 are normally open.

Normally closed outlet valves 9.10 and 9.11 of the first brake circuit 1.1 connect the wheel brakes 2.11 to a low-pressure reservoir 11.1, which, for its part, is connected to the intake of a hydraulic pump 3.1 as a pressure source and can be connected via a changeover valve 10.1 to the master brake cylinder 5. In corresponding fashion, normally closed outlet valves 9.20 and 9.21 of the second brake circuit 1.2 connect the wheel brakes 2.21 to a low-pressure reservoir 11.2, which, for its part, is connected to the intake of a hydraulic pump 3.2 as a pressure source and can be likewise connected via a changeover valve 10.2 to the master brake cylinder 5.

When the block valve 7.1 or 7.2 is closed, the hydraulic pumps 3.1 and 3.2 serve to build up pressure at the wheel brakes 2.11 and 2.21 by drawing in pressure medium from the storage reservoir 5.2 during an ABS or ESC control operation with changeover valve 10.1 or 10.2 open. During such an ABS or ESC control operation, the inlet and outlet valves 8.10 and 9.10, 8.11 and 9.11, 8.20 and 9.20, and 8.21 and 9.21 assigned to the wheel brakes 2.11 and 2.21 are activated alternately as pressure modulation units by the control unit 20 in the manner known to a person skilled in the art. To enable the pressure medium to be withdrawn from the wheel brakes 2.11 and 2.21 during an ABS or ESC control operation, the changeover valve 10.1 and 10.2, respectively, and the inlet valves 8.10 and 8.11, 8.20 and 8.21 are closed, while the outlet valves 9.10 and 9.11, 9.20 and 9.21 are open.

In the case of an ABS or ESC intervention, the pressure medium displaced into the low-pressure reservoirs 11.1 and 11.2 during a pressure reduction is pumped out again by means of the hydraulic pumps 3.1 and 3.2.

To detect the rotational behavior of the wheels 2.1 and 2.2, there are respective speed sensors S4, which feed their sensor signals to the control unit 20 for evaluation to enable a corresponding slip control operation to be carried out at the wheels 2.1 and 2.2.

The hydraulic pumps 3.1 and 3.2 are driven by an electric motor 4, which is electrically controllable by the control unit 20. Here, the electric motor 4 is activated in such a way that the hydraulic pumps 3.1 and 3.2 can build up a brake pressure on the high-pressure side by drawing in brake fluid on the intake side. This brake pressure built up by the hydraulic pumps 3.1 and 3.2 is in each case measured by a pressure sensor S1, which is arranged in the first brake circuit 1.1, and another pressure sensor S2, which is arranged in the second brake circuit 1.2.

To determine the volume of pressure medium which was delivered by the hydraulic pump 3.1 or 3.2 to build up the brake pressure measured by the pressure sensor S1 or S2, a rotational speed sensor S3 of the electric motor 4 is provided, which measures the number of revolutions corresponding to the pressure medium volume delivered.

When an emergency braking function is executed by means of a brake assistant or an EBS function, it is necessary to generate a hydraulic brake pressure quickly, that is to say in the shortest possible time period, for which reason the electric motor 4 which drives the hydraulic pumps 3.1 and 3.2 has a high power demand in specific situations, and therefore the on-board power system of the vehicle is very heavily loaded. However, the loading of the on-board power system is not to exceed a predefined upper current limit.

This pre-definition is difficult to satisfy particularly when the hydraulic pumps 3.1 and 3.2 in the two brake circuits 1.1 and 1.2 have to deliver the pressure medium counter to a high pressure. Such situations occur, for example, when an emergency braking function, such as a brake assistant (HBA) or fading brake support (FBS), is active together with an anti-lock brake control system (ABS). The following situations are to be differentiated here:

The emptying of the low-pressure reservoir 11.1 or 11.2 via the block valve 7.1 or 7.2 when the changeover valve 10.1 or 10.2 is closed. In this context, the situation can occur in which both hydraulic pumps 3.1 and 3.2 simultaneously have to deliver the content of the two low-pressure reservoirs 11.1 and 11.2 downstream of the block valves 7.1 and 7.2 into the reservoir container 5.2, wherein for this purpose the block valves 7.1 and 7.2 are opened, and in this way the braking medium volume is pumped counter to the sum of the differential pressure at the block valves 7.1 and 7.2 and the brake pressure generated by the driver by means of the brake pedal 6.

when the changeover valve 10.1 or 10.2 is opened, the hydraulic pump 3.1 or 3.2 delivers a volume of pressure medium from the reservoir container 5 in order to generate an admission pressure actively between the block valve 7.1 or 7.2, the hydraulic pump 3.1 or 3.2 and the inlet valves 8.10 and 8.11 or 8.20 and 8.21 with the block valve 7.1 or 7.2 partially activated, i.e. regulated, with the result that at any time an ABS pressure buildup is made possible via the then partially activated inlet valves 8.10 and 8.11 or 8.20 and 8.21. In this case, the volume of braking medium is delivered counter to the differential pressure at the partially activated block valve 7.1 or 7.2.

SUMMARY OF THE INVENTION

Taking the above-mentioned problem as a starting point, an aspect of the invention is a method for operating a dual-circuit hydraulic brake system of a vehicle with which the engine load of the electric motor 4 which drives the hydraulic pumps 3.1 and 3.2 is limited in all operating situations of the brake system in such a way that a predefined load limit of the on-board power system is not exceeded.

In this method for operating a dual-circuit hydraulic brake system of a vehicle having an ABS function, in which brake system each brake circuit has in each case two inlet valves and two outlet valves, an electrically actuated block valve, an electrically actuated changeover valve, a low-pressure reservoir for storing pressure medium while the ABS function is being carried out, and a hydraulic pump for feeding back pressure medium from the low-pressure reservoir into a master brake cylinder of the brake system, or the brake circuit, wherein the hydraulic pumps can be driven jointly by an electric motor, there is provision according to an aspect of the invention that when there is an autonomous pressure buildup request to increase a brake pressure in at least one wheel brake cylinder of the brake system and an ABS control system is simultaneously activated, the following method steps are carried out:

monitoring the degree of filling of the low-pressure reservoirs, emptying, by means of the associated feedback pump, that low-pressure reservoir whose degree of filling first reaches a defined threshold value of the degree of filling by closing the changeover valve of the associated brake circuit, and if, during the execution of the low-pressure reservoir emptying process at the one low-pressure reservoir, the degree of filling of the other low-pressure reservoir reaches the threshold value of the degree of filling and the degree of emptying of the one low-pressure reservoir undershoots a defined threshold value of the degree of emptying, or the degree of filling of the other low-pressure reservoir exceeds the threshold value of the degree of filling by k/100, interrupting the low-pressure reservoir emptying process at the one low-pressure reservoir by opening the associated changeover valve, and carrying out a low-pressure reservoir emptying process at the other low-pressure reservoir by means of the associated hydraulic pump by closing the associated changeover valve.

In this method, the emptying of the two low-pressure reservoirs 11.1 and 11.2 never occurs simultaneously, with the result that the electric motor 4 is only ever loaded by one hydraulic pump 3.1 or 3.2, and as a result the loading of the on-board power system of the vehicle is also correspondingly limited.

The method according to an aspect of the invention provides that that low-pressure reservoir whose degree of filling reaches a threshold value of the degree of filling for the emptying process is emptied first. If the degree of filling of the other low-pressure reservoir also reaches the threshold value of the degree of filling for emptying during this emptying process, the emptying of the first low-pressure reservoir is interrupted if its degree of emptying indicates a threshold value of the degree of emptying, for example 50%, or the degree of filling of the other low-pressure reservoir exceeds the threshold value of the degree of filling by k/100, for example 50%.

One advantageous refinement of an aspect of the invention provides that in order to feed back pressure medium into the master brake cylinder by means of the block valve of the respective brake circuit, the overflow-pressure is regulated by adjusting the block valve to a pressure value which results from the sum of that pressure value which corresponds to the greater of the setpoint pressure values of a brake circuit which are predefined by the pressure buildup request, and from an overflow offset value.

The activation of the block valve is thus reduced to an appropriate minimum corresponding to the greater setpoint value of the two brakes in the respective hydraulic brake circuit plus an overflow offset, of for example 30 bar, in order to compensate for effects at the block valve which is being flowed through and to achieve the best possible pressure setting.

In a further preferred development of an aspect of the invention, when low overflow-pressures are generated by the hydraulic pumps, the electric motor is driven at high rotational speeds. The electric motor is therefore operated at a higher rotational speed in a state with a lower load, resulting in the storage of kinetic energy which can be retrieved, when necessary, in particular for the generation of high brake pressures.

BRIEF DESCRIPTION OF THE DRAWINGS

The method according to an aspect of the invention will be described below on the basis of an exemplary embodiment and with reference to the appended figures, in which.

DETAILED DESCRIPTION OF THE PREFERRED EMBODIMENTS

Figure 1:
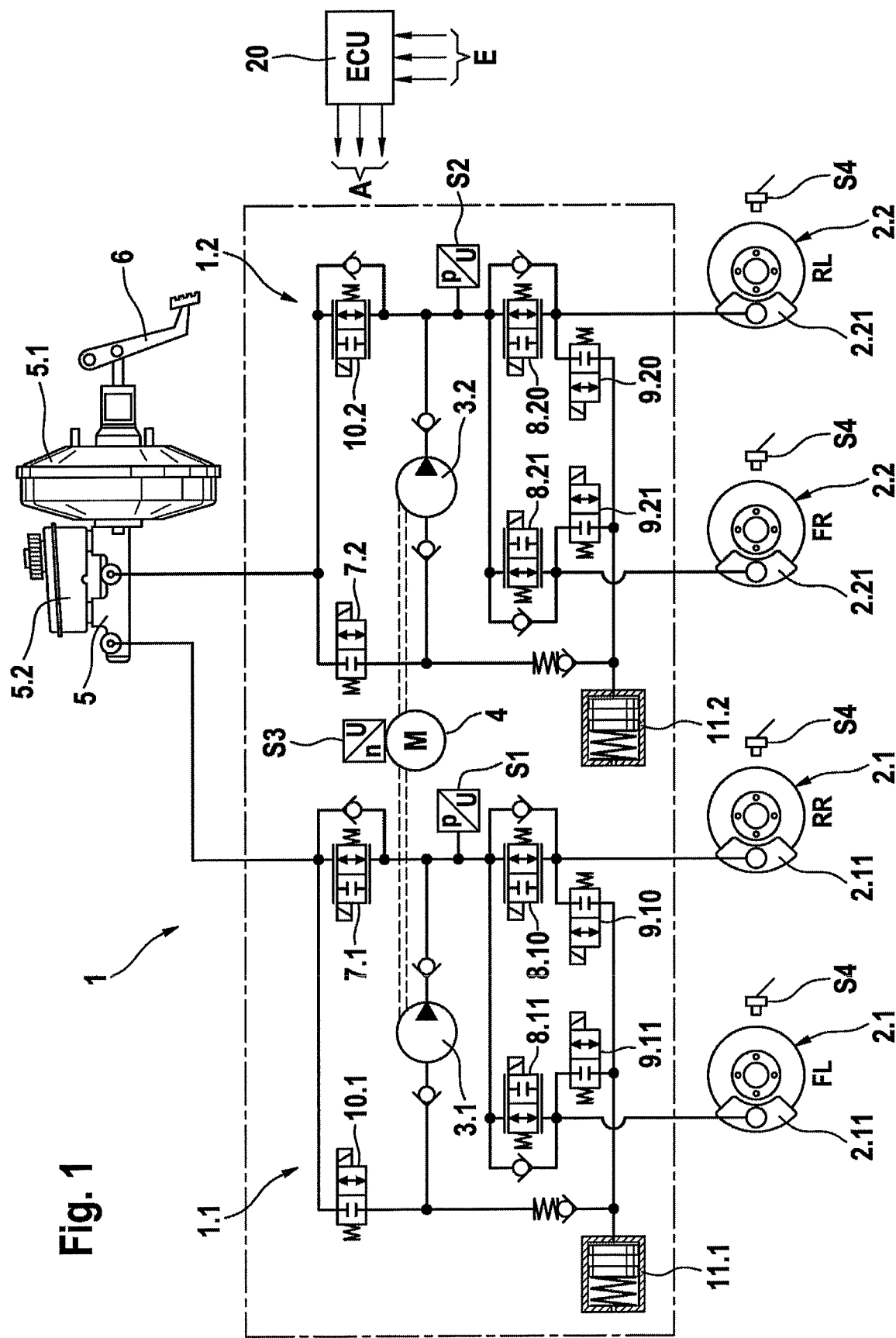
FIG. 1 shows a schematic illustration of a hydraulic brake system explaining an embodiment of the method according to an aspect of the invention.

The hydraulic brake system according to FIG. 1 which is used to implement the exemplary embodiment has a design which is known from the prior art and has already been described in detail in the introduction to the description. For an explanation of the exemplary embodiment with reference to the flow diagram according to FIG. 2, reference is therefore made to FIG. 1.

As already described at the beginning, in order to execute an emergency braking function by means of a brake assistant or an EBS function in this hydraulic brake system according to FIG. 1, it is necessary to generate a hydraulic brake pressure quickly, that is to say in the shortest possible time period, for which reason the electric motor 4 which drives the hydraulic pumps 3.1 and 3.2 has a high power demand in specific situations, and therefore the on-board power system of the vehicle is very heavily loaded. However, the loading of the on-board power system is not to exceed a predefined upper current limit.

With the exemplary embodiment of the method according to an aspect of the invention, the motor load of the electric motor 4 which drives the hydraulic pumps 3.1 and 3.2 is limited in all operating situations of the brake system in such a way that a predefined load limit of the on-board power system is not exceeded. This is achieved in that the two low-pressure reservoirs 11.1 and 11.2 of the two brake circuits 1.1 and 1.2 are never emptied simultaneously, and the electric motor 4 is therefore only ever loaded by one hydraulic pump 3.1 or 3.2. The lower loading of the electric motor 4 therefore also brings about low loading of the on-board power system of the vehicle.

Figure 2:
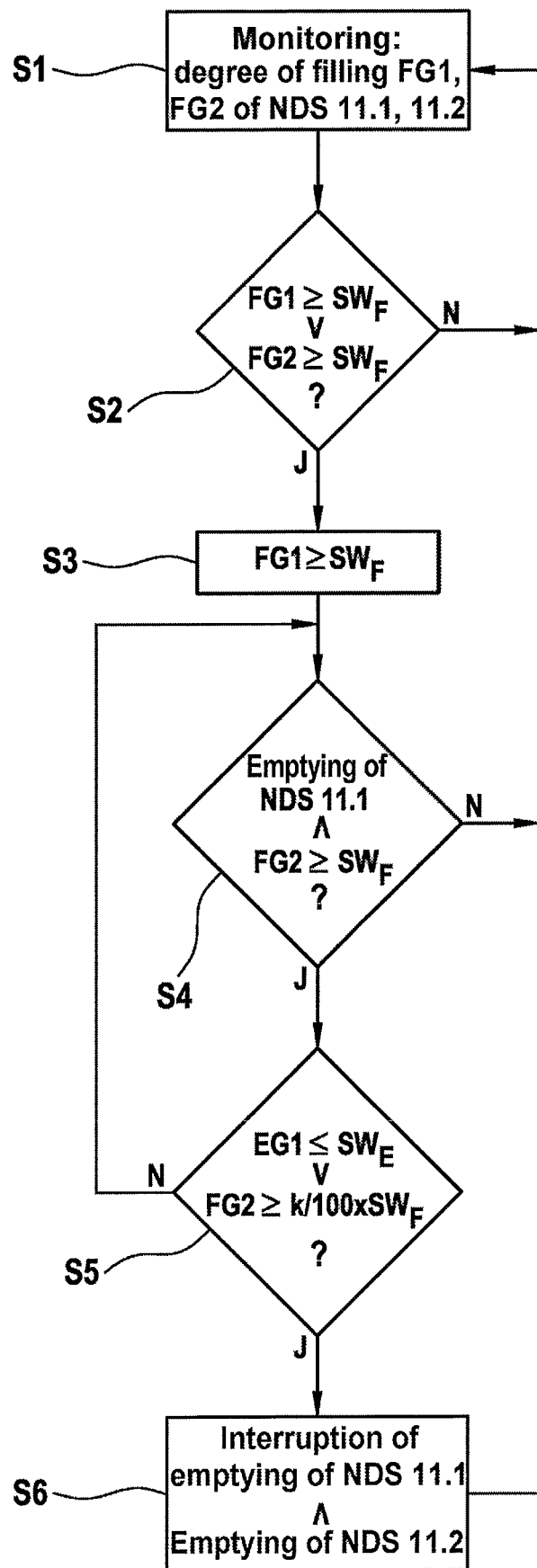
FIG. 2 shows a flow diagram of an exemplary embodiment of the method according to an aspect of the invention.

The exemplary embodiment will now be described and explained in detail with reference to the flow diagram according to FIG. 2.

While the hydraulic brake system 1 is operating, in particular, when there is an autonomous pressure buildup request to increase a brake pressure in at least one wheel brake cylinder of the brake system 1 and an ABS control system is simultaneously activated, the following method steps are carried out: According to a first method step S1, the degree of filling FG1 and FG2 of the low-pressure reservoir (NDS) 11.1 of the first brake circuit 1.1 and the degree of filling FG2 of the low-pressure reservoir (NDS) 11.2 of the second brake circuit 1.2 are monitored. The degree of filling FG1 and FG2 can be measured by means of a sensor or determined approximately by forming a volume model.

According to one method step S2 it is checked which of the two low-pressure reservoirs 11.1 or 11.2 has a degree of filling FG1 or FG2 which is greater than a threshold value $SW_F$ of the degree of filling, that is to say whether $FG1 \geq SW_F$ or $FG2 \geq SW_F$ applies.

With a method step S3 it is detected that the low-pressure reservoir 11.1 reaches its threshold value $SW_F$ of the degree of filling for the emptying process, that is to say $FG1 \geq SW_F$ applies. The low-pressure reservoir 11.1 is emptied by closing the changeover valve 10.1.

With a subsequent method step S4 it is checked whether during the emptying of the low-pressure reservoir (NDS) 11.1, the other low-pressure reservoir (NDS) 11.2 reaches a degree of filling FG2 which is greater than the threshold value $SW_F$ of the degree of filling, that is to say whether $FG2 \geq SW_F$ applies. If this is not the case, a jump back to a method step S1 occurs.

If it is the case, in a further method step S5 it is tested whether the emptying of the low-pressure reservoir 11.1 has brought about a degree of emptying EG1 which is smaller than a threshold value $SW_E$ of the degree of emptying, by for example 50%, that is to say whether $EG1 \leq SW_E$ applies, or whether the degree of filling FG2 of the other low-pressure reservoir 11.2 has exceeded the threshold value $SW_F$ of the degree of filling by more than k %, for example 50%, that is to say whether $FG2 \geq k/100 \times SW_F$ applies. If this is the case, according to a method step S6, the emptying of the low-pressure reservoir (NDS) 11.1 is interrupted, i.e. the changeover valve 10.1 is opened and the emptying of the other low-pressure reservoir (NDS) 11.2 is started by means of the hydraulic pump 3.2 by closing the changeover valve 10.2. Subsequently, a jump back to method step S1 occurs.

A further measure for reducing the motor load of the electric motor 4 by means of the hydraulic pump 3.1 and 3.2 consists in the fact that, in order to feed back pressure medium into the master brake cylinder 5 by means of the block valve 7.1, 7.2 of the respective brake circuit 1.1, 1.2, the overflow-pressure is regulated by adjusting the block valve 7.1 or 7.2 to a pressure value which results from the sum of that pressure value which corresponds to the greater of the setpoint pressure values of the brake circuit 1.1 or 1.2 which are predefined by the pressure buildup request, and from an overflow offset value, of for example 30 bar.

The activation of the block valve 10.1 or 10.2 is thus reduced to an appropriate minimum corresponding to the greater setpoint value of the two brakes in the respective hydraulic brake circuit 1.1 or 1.2 plus an overflow offset, of for example 30 bar, in order to compensate for effects at the block valve 10.1 or 10.2 which is being flowed through and to achieve the best possible pressure setting.

A further reduction in the motor load of the electric motor 4 is achieved in that when low overflow-pressures are generated by the hydraulic pumps 3.1 and/or 3.2, the electric motor 4 is driven at high rotational speeds. This brings about a situation in which, as a result of the operation of the electric motor at high rotational speeds with a low load, kinetic energy is stored which can be retrieved, when necessary, for the generation of high brake pressures.

LIST OF REFERENCE SIGNS

1 Brake system
1.1 First brake circuit of the brake system 1
1.2 Second brake circuit of the brake system 1
2.1 Left-hand front wheel FL, right-hand rear wheel RR
2.11 Wheel brake of the first brake circuit 1.1
2.2 Right-hand front wheel FR, left-hand rear wheel RL
2.21 Wheel brake of the second brake circuit 1.2
3.1 Hydraulic pump of the first brake circuit 1.1
3.2 Hydraulic pump of the second brake circuit 1.2
4 Electric motor
5 Master brake cylinder
5.1 Brake booster
5.2 Reservoir for pressure medium
6 Brake pedal
7.1 Block valve of the first brake circuit 1.1
7.2 Block valve of the second brake circuit 1.2
8.10 Inlet valve of the first brake circuit 1.1
8.11 Inlet valve of the first brake circuit 1.1
8.20 Inlet valve of the second brake circuit 1.2
8.21 Inlet valve of the second brake circuit 1.2

9.10 Outlet valve of the first brake circuit 1.1
9.11 Outlet valve of the first brake circuit 1.1
9.20 Outlet valve of the second brake circuit 1.2
9.21 Outlet valve of the second brake circuit 1.2
10.1 Changeover valve of the first brake circuit 1.1
10.2 Changeover valve of the second brake circuit 1.2
11.1 Low-pressure reservoir of the first brake circuit 1.1
11.2 Low-pressure reservoir of the second brake circuit 1.2
S1 Pressure sensor
S2 Pressure sensor
S3 Rotational speed sensor
S4 Rotational speed sensor
S7 Pressure sensor
EG1 Degree of emptying of low-pressure reservoir 11.1
EG2 Degree of emptying of low-pressure reservoir 11.2
FG1 Degree of filling of low-pressure reservoir 11.1
FG2 Degree of filling of low-pressure reservoir 11.2
$SW_F$ Threshold value of degree of filling
$SW_E$ Threshold value of degree of emptying

The invention claimed is:

1. A method for operating a dual-circuit hydraulic brake system of a vehicle having an ABS function, wherein each brake circuit has in each case two inlet valves and two outlet valves, an electrically actuated block valve, an electrically actuated changeover valve, a low-pressure reservoir for storing pressure medium while an ABS function is being carried out, and a hydraulic pump for feeding back pressure medium from the low-pressure reservoir into a master brake cylinder of the brake system, or the brake circuit, wherein the hydraulic pumps can be driven jointly by an electric motor, wherein
when there is an autonomous pressure buildup request to increase a brake pressure in at least one wheel brake cylinder of the brake system and an ABS control system is simultaneously activated, the method comprises:
monitoring the degree of filling of the low-pressure reservoirs,
emptying, by the associated hydraulic pump, that low-pressure reservoir whose degree of filling first reaches a defined threshold value of the degree of filling, by closing the changeover valve of the associated brake circuit, and
if, during the execution of the low-pressure reservoir emptying process at the one low-pressure reservoir, the degree of filling of the other low-pressure reservoir reaches the threshold value of the degree of filling and the degree of emptying of the one low-pressure reservoir undershoots a defined threshold value of the degree of emptying, or the degree of filling of the other low-pressure reservoir exceeds the threshold value of the degree of filling by a predetermined percentage, interrupting the low-pressure reservoir emptying process at the one low-pressure reservoir by opening the associated changeover valve, and carrying out a low-pressure reservoir emptying process at the other low-pressure reservoir by the associated feedback pump by closing the associated changeover valve.

2. The method as claimed in claim 1, wherein in order to feed back pressure medium into the master brake cylinder by the block valve of the respective brake circuit, the overflow-pressure is regulated by adjusting the block valve to a pressure value which results from the sum of that pressure value which corresponds to the greater of the setpoint pressure values of a brake circuit which are predefined by the pressure buildup request, and from an overflow offset value.

3. The method as claimed in claim 1, wherein when low overflow-pressures are generated by the hydraulic pumps, the electric motor is driven at high rotational speeds.

4. The method as claimed in claim 2, wherein when low overflow-pressures are generated by the hydraulic pumps, the electric motor is driven at high rotational speeds.

* * * * *